United States Patent Office 3,008,958
Patented Nov. 14, 1961

3,008,958
16,17-CYCLIC KETALS AND ACETALS OF 16α,17α-DIHYDROXY-PROGESTERONE
Josef Fried, Princeton, and Patrick A. Diassi, Westfield, N.J., assignors to Olin Mathieson Chemical Corporation, New York, N.Y., a corporation of Virginia
No Drawing. Filed Jan. 27, 1961, Ser. No. 85,187
7 Claims. (Cl. 260—239.55)

This invention relates to, and has for its object the provision of a method of preparing physiologically active steroids, and to certain new steroidal compounds useful as intermediates in said method.

16,17-cyclic ketals and acetals of 16α,17α-dihydroxy-progesterone are known compounds which have proven utility as progestational agents. Such compounds are of the general Formula I:

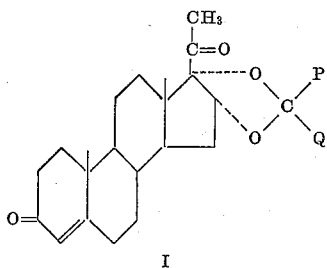

I wherein P is lower alkyl, halo(lower alkyl), monocyclic cycloalkyl, monocyclic aryl, monocyclic aryl-lower alkyl, monocyclic heterocyclic or monocyclic heterocylic-lower alkyl; Q is hydrogen, lower alkyl, halo(lower alkyl), monocyclic cycloalkyl, monocyclic aryl, monocyclic aryl-lower alkyl, monocyclic heterocyclic or monocyclic heterocyclic-lower alkyl; or together with the carbon to which they are joined P and Q are cycloalkyl or monocyclic heterocyclic. Particularly preferred are those compounds wherein P is lower alkyl and Q is monocyclic aryl or monocyclic heterocyclic.

These physiologically active steriods are prepared in accordance with the method of this invention by a series of steps, the last two of which entail the monobromination of a steroid of the general Formula II:

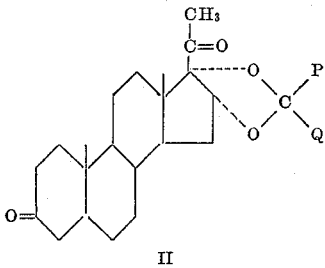

II wherein P and Q are as hereinbefore defined, to yield new intermediates of this invention of the general Formula III:

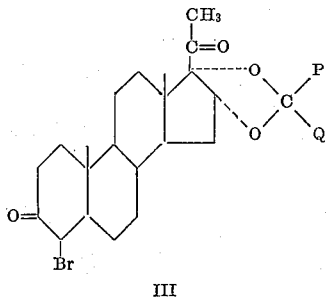

III wherein P and Q are as hereinbefore defined, and the dehydrobromination of the latter to yield the final products of this invention (Compounds I).

The 4β-bromo intermediates are prepared by interacting a compound of Formula II with approximately 1 mole of bromine per mole of steroid, the reaction preferably being conducted in an acidic medium (e.g., in glacial acetic acid). The resulting 4β-bromo compound is then dehydrobrominated by any one of a number of processes. One such process entails the treatment of the 4β-bromo compound with lithium chloride, preferably at an elevated temperature in the presence of a solvent, such as dimethylformamide. In accordance with another process, a tertiary base, such as collidine, is employed as the dehydrobrominating reagent.

Compounds of Formula II are new compounds of this invention which may be prepared by a number of processes of this invention. In accordance with one such process a 16,17-dehydro steroid of the general Formula IV:

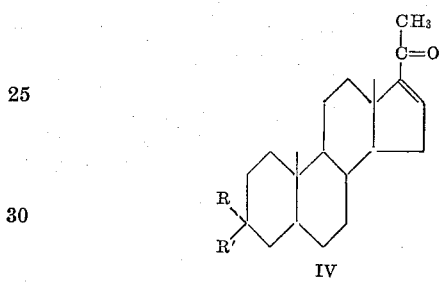

IV wherein R is hydrogen, R' is hydroxy or acyloxy (preferably the acyloxy radical of a hydrocarbon carboxylic acid of less than ten carbon atoms, such as a lower alkanoic acid, as exemplified by acetic, propionic and tert-pentanoic acid; a monocyclic aryl carboxylic acid, as exemplified by benzoic and toluic acid; a monocyclic aryl lower alkanoic acid, as emplified by phenacetic and β-phenylpropionic acid; a lower alkenoic acid; a cycloalkane carboxylic acid; or a cycloalkene carboxylic acid); or together R and R' is keto (O=), is reacted with a permanganate, such as an alkali metal permanganate (e.g., potassium permanganate), to yield the corresponding 16α,17α-dihydroxy derivative of the general Formula V:

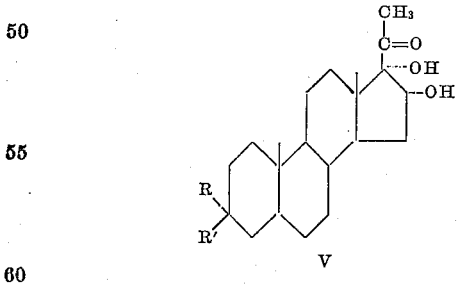

V wherein R and R' are as hereinbefore defined. The reaction is preferably conducted in the cold (below room temperature) in an acidic medium, such as glacial acetic acid.

The dihydroxy steroid is then treated with a carbonyl reactant of the general formula:

wherein P and Q are as hereinbefore defined, to yield compounds of the general Formula VI:

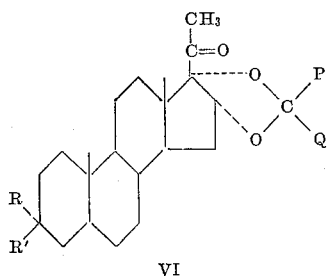

wherein R, R′, P and Q are as hereinbefore defined.

The reaction is preferably carried out by treating a suspension or solution of the steroid of the Formula V in the desired aldehyde or ketone (or an organic solvent, if the aldehyde or ketone is a solid) with an acid catalyst (e.g., perchloric acid, p-toluenesulfonic acid and hydrochloric acid), neutralizing the acid and recovering the cyclic acetal or ketal derivative formed.

Among the suitable aldehyde and ketone reactants may be mentioned lower alkanals, such as ethanal (preferably paraldehyde), propanal and hexanal; di(lower alkyl)-ketones, such as acetone, diethylketone, dibutylketone, methylethylketone, and methylisobutylketone; cycloalkanones such as cyclobutanone, cyclopentanone, cyclohexanone, suberone, and cyclodexanone; mono and dicycloalkyl ketones such as cyclohexylmethylketone and dicyclopropylketone, halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g. p-chlorobenzaldehyde and p-fluorobenzaldehyde), lower alkoxybenzaldehydes (e.g. o-anisaldehyde), di(lower alkoxy)benzaldehydes (e.g. veratraldehyde), hydroxybenzaldehydes (e.g. salicylaldehyde), dihydroxybenzaldehydes (e.g. resorcyaldehyde), lower alkyl benzaldehydes (e.g. m-tolualdehyde and p-ethylbenzaldehyde), di(lower alkyl)benzaldehydes (e.g. o, p-dimethylbenzaldehyde), nitrobenzaldehydes, acylamidobenzaldehydes (e.g. N-acetylanthranilaldehyde) and cyanobenzaldehydes; monocyclic carbocycli aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; 1-(monocyclic carbocyclic aromatic) substituted lower alkanals such as acetophenone, α,α,α-trifluoroacetophenone, propiophenone, butyrophenone, valerophenone, isocaprophenone, halophenyl lower alkyl ketones (e.g. p-chloroacetophenone and p-chloropropiophenone), (lower alkoxy)phenyl lower alkyl ketones (e.g. p-anisyl methyl ketone), di(lower alkoxy)phenyl lower alkyl ketones, hydroxy-phenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)-phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; 1-(monocyclic heterocyclic) substituted lower alkanals, such as 2-acetylfuran, 2-benzoylfuran, 2-acetyl-thiophene; oxo substituted monocyclic heterocyclics, such as alloxan; and monocyclic heterocyclic lower alkanones.

Those compounds of the Formula VI, wherein together R and R′ is keto, correspond to compounds of the Formula II and thus may be used as intermediates in the final two steps of the process. Where the compounds of Formula VI which are obtained have an R value of hydrogen and an R′ value of either hydroxy or acyloxy, they are converted to compounds of the Formula II by a two-step process (if R′ is acyloxy) consisting of first hydrolyzing off the 3-ester group by treatment with a base, such as an alkali hydroxide (e.g., potassium hydroxide), and then oxidizing the resulting 3-hydroxy group to a keto group, as by treatment with an oxidizing agent such as chromic anhydride. If the compound of Formula VI initially obtained contains a free 3-hydroxy group, the hydrolysis step can, of course, be omitted and the compound directly oxidized to the corresponding 3-keto derivative.

Compounds of the Formula V can also be obtained by an alternative process of this invention using 16α,17α-epoxy steroid of the general Formula VII:

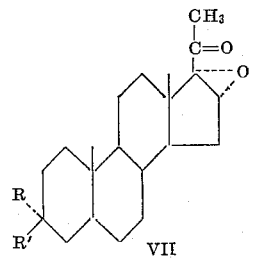

wherein R and R′ are as hereinbefore defined, as the initial reactant.

This conversion is effected in a four-step process, as shown by the following equations, wherein R and R′ are as hereinbefore defined, R″ is hydrogen, R‴ is acyloxy (preferably the acyloxy radical of a hydrocarbon carboxylic acid of less than ten carbon atoms, as hereinbefore defined), or together R″ and R‴ is keto, and R⁗ is the acyl radical of a hydrocarbon carboxylic acid of less than ten carbon atoms, as hereinbefore defined:

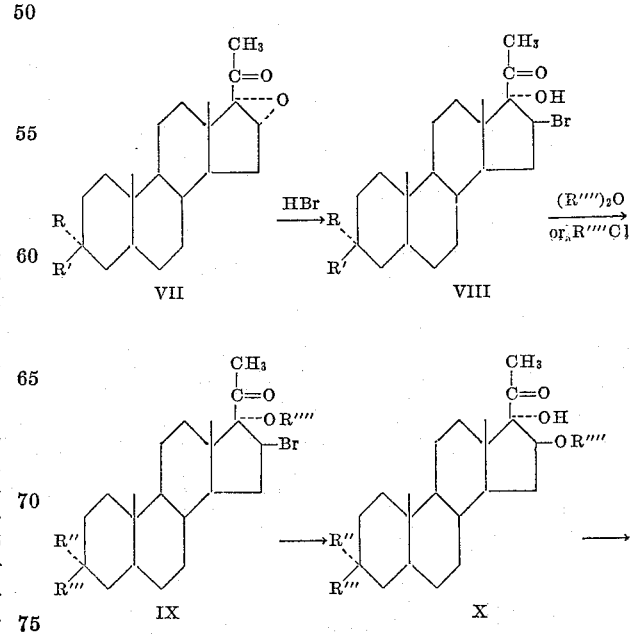

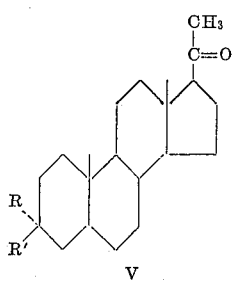

V

Compounds of the general Formulae VIII, IX and X are new compounds of this invention.

To effect these conversions, a compound of Formula VII is reacted with hydrogen bromide in an acidic medium, such as glacial acetic acid. By this reaction the epoxy group is cleaved yielding a 16β-bromo-17α-hydroxy derivative (compounds of Formula VIII). Suitable steroid reactants include 16α,17α-oxido-5β-pregnane-3β-ol-20-one, 3-esters thereof (preferably esters with hydrocarbon carboxylic acids of less than ten carbon atoms, such as those listed hereinbefore), and 16α,17α-oxido-5β-pregnane-3,20-dione.

Compounds of the Formula VIII are then acylated by treatment with an acylating agent such as an acid anhydride or acyl chloride, preferably either the acid anhydride or acyl chloride of a hydrocarbon carboxylic acid of less than ten carbon atoms, such as the acids listed hereinbefore. The reaction is preferably conducted in the presence of an esterification catalyst such as p-toluenesulfonic acid. If a steroid containing a free 3-hydroxy group is used as the reagent, the 3-hydroxy group is also esterified. The reaction results in the formation of compounds of the Formula IX, wherein the 17α-hydroxy group (and the 3β-hydroxy group) has been esterified Compounds of the Formula IX are then treated with a buffer comprising a weak acid and a salt thereof with a strong base (e.g., acetic acid plus sodium acetate) to yield compounds of the Formula X.

Compounds of the Formula X are then hydrolyzed by treatment with a weak base, such as an alkali metal carbonate or bicarbonate (e.g., potassium carbonate) to hydrolyze the 16-ester grouping. Because the 16-ester group is more labile than is any 3-ester substituent, if a 3,16-diester is employed as the steroid reactant and the reaction is carried out under controlled conditions, such as room temperature or below and a limited length of time (e.g., less than 1 hour), a 3-monoester is produced.

The resulting compounds of the Formula V can then be treated as stated hereinbefore to yield the final products of this invention.

The following examples illustrate the invention (all temperatures being in centigrade):

EXAMPLE 1

*16β-bromo-5β-pregnane-3β,17α-diol-20-one 3-acetate*

To a stirred solution of 5.0 g. of 16α,17α-oxido-5β-pregnane-3β-ol-20-one acetate in 50 ml. of glacial acetic acid is added slowly 5 ml. of 33% hydrogen bromide in glacial acetic acid. The reaction mixture is left at room temperature for 30 minutes and then diluted with 50 ml. of water. The gum which separates is extracted with chloroform (2 x 50 ml.) and the combined chloroform extracts are washed successively with 100 ml. of water, 5% $NaHCO_3$ and water and then evaporated to dryness in vacuo. Crystallization of the residue from acetone-hexane gives about 5.9 g. of 16β-bromo-5β-pregnane-3β,17α-diol-20-one 3-acetate having M.P. of about 137–139°, $[\alpha]_D^{23}$ +17.9° (chlf.);

$$\lambda_{max}^{Nujol}\ 2.87,\ 5.86–5.88\mu$$

*Analysis.*—Calc'd for $C_{23}H_{35}O_4Br$ (455.43): C, 60.66; H, 7.75; Br, 17.55. Found: C, 60.88; H, 7.88; Br, 16.87.

EXAMPLE 2

*16β-bromopregnane-17α-ol-3,20-dione*

Following the procedure of Example 1, but substituting 5 g. of 16α,17α-oxido-5β-pregnane-3,20-dione for the steroid reactant, 16β-bromopregnane-17α-ol-3,20-dione is obtained.

Similarly, if 16α,17α-oxido-5β-pregnane-3β-ol-20-one is substituted for the steroid reactant in Example 1, 16β-bromo - 5β - pregnane - 3β,17α - diol-20-one is obtained. Moreover, if other 3-esters are substituted for the 3-acetate reactant the corresponding 3-ester derivatives are formed.

EXAMPLE 3

*16β-bromo-5β-pregnane-3β,17α-diol-20-one 3,17-diacetate*

To a stirred suspension of 1.0 g. of 16β-bromo-5β-pregnane-3β,17α-diol-20-one 3-actate in 13 ml. of acetic anhydride is added 200 mg. of p-toluene sulfonic acid monohydrate and the mixture is stirred at room temperature for 19 hours. Ice water (100 ml.) is then added slowly with stirring until the acetic anhydride is completely hydrolysed and then the mixture is extracted with 2 x 50 ml. portions of chloroform. The combined chloroform extracts are washed successively with water, 5% $NaHCO_3$ and water and then evaporated to dryness in vacuo. Crystallization of the residue from acetone-hexane gives about 860 mg. of 16β-bromo-5β-pregnane-3β,17α-diol-20-one 3,17-diacetate having M.P. of about 147–149°, $[\alpha]_D^{23}$ +23.5° (chlf.);

$$\lambda_{max}^{Nujol}\ 5.88–5.92\mu$$

*Analysis.*—Calc'd for $C_{25}H_{37}O_5Br$ (497.47): C, 60.35 H, 7.50; Br, 16.05. Found: C, 60.52; H, 7.55; Br, 15.57.

EXAMPLE 4

*16β-bromo-5β-pregnane-17α-ol-3,20-dione 17-acetate*

Following the procedure of Example 3, but substituting 1 g. of 16β-bromopregnane-17α-ol-3,20-dione for the steroid reactant, 16β-bromo-5β-pregnane-17α-ol-3,20-dione 17-acetate is obtained.

Similarly, other 3 - esters 16β - bromo - 5β - pregnane-3β-17α-diol-20-one yield the corresponding 17-acetate-3-ester derivatives.

EXAMPLE 5

*16β-bromo-5β-pregnane-3β,17α-diol-20-one 3,17-diacetate*

Following the procedure of Example 3, but substituting 0.5 g. of 16β-bromo-5β-pregnane-3β,17α-diol-20-one for the steroid reactant, 16β-bromo-5β-pregnane-3β,17α-diol-20-one, 3,17-diacetate, identical with the product obtained in Example 3, is formed.

EXAMPLE 6

*16β-bromo-5β-pregnane-3β,17α-diol-20-one 3-acetate 17-propionate*

Following the procedure of Example 3 but substituting 16 ml. of propionic anhydride for the acetic anhydride, 16β-bromo-5β-pregnane-3β,17α-diol-20-one 3-acetate 17-propionate is obtained.

EXAMPLE 7

*5β-pregnane-3β,16α,17α,triol-20-one 3-acetate*

(a) PREPARATION OF 5β-PREGNANE-3β,16α,17α-TRIOL-20-ONE 3,16-DIACETATE

To a solution of 860 mg. of 16β-bromo-5β-pregnane-3β,17α-diol-20-one 3,17-diacetate in 50 ml. of glacial acetic acid is added 2.5 g. of anhydrous sodium acetate and the mixture is heated on a steam bath for three hours. After cooling, 200 ml. of water is added slowly and the mixture is extracted with 2 x 100 ml. of chloroform. The combined chloroform extracts, after washing with 5% sodium bicarbonate and water, are evaporated to dryness in vacuo to yield a residue of 5β-pregnane-3β,16α,17α-triol-20-one 3,16-diacetate.

(b) PREPARATION OF 5β-PREGNANE-3β,16α,17α-TRIOL-20-ONE 3-ACETATE

The residue of 5β-pregnane-3β,16α,17α-triol-20-one 3,16-diacetate obtained in step a is dissolved in 250 ml. of methanol and 25 ml. of 10% potassium carbonate (both of which had been previously purged with nitrogen for 15 minutes) and the mixture is left under nitrogen at room temperature for 30 minutes. The solution is then neutralized with 25 ml. of 10% acetic acid and diluted with 250 ml. of water. On standing crystals separate. These are filtered, washed with water and dried to give about 4.00 g. of 5β-pregnane-3β,16α,17α-triol-20-one 3-acetate having M.P. of about 206–208°.

Analysis.—Calc'd for $C_{23}H_{36}O_5$ (392.52): C, 70.37; H, 9.24. Found: C, 70.16; H, 9.20.

If 16β-bromo-5β-pregnane-3β,17α-diol-20-one 3-acetate 17-propionate is substituted for the steroid reactant in step a of Example 7 and the procedure of Example 7 is carried out, 5β-pregnane-3β,16α,17α-triol-20-one 3-acetate is also obtained.

EXAMPLE 8

*5β-pregnane-16α17α-diol-3,20-dione*

Following the procedure of Example 7, but substituting 800 mg. of 16β-bromo-5β-pregnane-17α-ol-3,20-dione 17-acetate for the steroid reactant in step a, 5β-pregnane-16α,17α-diol-3,20-dione is obtained.

EXAMPLE 9

*Pregnane-3β,16α,17α-triol-20-one 3-acetate*

To a solution of 2 g. of $\Delta^{16}$-pregnene-3β-ol-20-one 3-acetate in 40 ml. of acetone and .8 ml. of glacial acetic acid is added at 0° a solution of 1.28 g. of potassium permanganate in a mixture of 34 ml. of acetone and 6 ml. of water. When the addition is complete (approximately 5 minutes) 8 ml. of a 10% aqueous solution of sodium bisulfite is added, the mixture filtered and the precipitate washed thoroughly with hot chloroform. The chloroform washings are kept separate. The filtrate, after addition of water, is concentrated and the resulting suspension extracted with chloroform. The chloroform extract and washings of the filter cake are combined, dried over sodium sulfate, evaporated to dryness and the crystalline residue recrystallized from acetone. There is obtained about 1.2 g. of pure pregnane-3β,16α,17α-triol-20-one 3-acetate melting at about 205–208° identical in all respects with the material prepared in Example 7.

Similarly, if other 3-esters, such as the propionic and benzoic acid esters, of $\Delta^{16}$-pregnene-3β-ol-20-one are substituted for the steroid reactant in Example 9, the corresponding 3-ester derivatives of pregnane-3β,16α,17α-triol-20-one are obtained. Moreover, $\Delta^{16}$-pregnene-3β-ol-20-one yields, by the procedure of Example 9, pregnane-3β,16α,17α-triol-20-one.

EXAMPLE 10

*Pregnane-16α,17α,-diol-3,20-dione*

Following the procedure of Example 9 but substituting 2 g. of $\Delta^{16}$-pregnene-3,20-dione for the steroid reactant, pregnane-16α,17α-diol-3,20-dione is obtained.

EXAMPLE 11

*5β-pregnane-3β,16α,17α-triol-20-one 3-acetate 16,17-acetophenonide*

To a stirred suspension of 3.85 g. of 5β-pregnane-3β,16α-17α-triol-20-one 3-acetate in 38 ml. of acetophenone is added 0.2 ml. of 70% perchloric acid and the mixture is stirred at room temperature for 90 minutes. The steroid dissolves completely within 30 minutes. The solution is neutralized with 5% $NaHCO_3$ and then distributed between 200 ml. each of chloroform and water. The organic phase is separated, washed well with water, and evaporated to dryness in vacuo. Crystallization of the residue from acetone-hexane gives about 3.85 g. of 5β-pregnane-3β,16α,17α-triol-20-one 3-acetate 16,17-acetophenonide having M.P. of about 165–167°, $[\alpha]_D^{25}$ +13.7° (chlf.);

$\lambda_{max}^{Nujol}$ 5.78, 5.85, 13.13, 14.32μ

Analysis.—Calc'd for $C_{31}H_{42}O_5$ (494.65): C, 75.27; H, 8.56. Found: C, 75.64; H, 8.66.

Similarly, by substituting other aldehydes and ketones for the acetophenone in Example 11, the corresponding 16,17-cyclic acetal and ketal derivatives are formed. Thus, acetone, paraldehyde, benzaldehyde, propanol, 2-thionyl methyl ketone, 2-thionylaldehyde, cyclopentanone, propiophenone, chloral hydrate, o-chlorobenzaldehyde, m-fluorobenzaldehyde yield the corresponding 16,17α ketals or acetals.

EXAMPLE 12

*5β-pregnane-16α,17α-diol-3,20-dione 16,17-acetophenonide*

Following the procedure of Example 11 but substituting 3.5 g. of 5β-pregnane 16α,17α-diol-3,20-dione for the steriod reactant, 5β-pregnane-16α,17α-diol-3,20-dione 16,17-acetophenonide is formed.

Similarly, by substituting other aldehydes and ketones for the acetophenone in Example 12, the corresponding 16,17-cyclic acetals and ketals are formed.

EXAMPLE 13

*5β-pregnane-3β,16α,17α-triol-20-one 16,17-acetophenonide*

A solution of 660 mg. of 5β-pregnane-3β,16α,17α-triol-20-one 3-acetate 16,17-acetophenonide in 40 ml. of 5% KOH in methanol is refluxed under nitrogen for two hours. The solution is cooled, neutralized with acetic acid, and diluted with 30 ml. of water. On evaporation of 10 ml. of the solution in vacuo, crystals separate. These are filtered, washed with water and dried to give about 858 mg. of 5β-pregnane-3β,16α,17α-triol-20-one 16,17-acetophenonide having M.P. of about 170–171°, $[\alpha]_D^{23}$ +13.0° (chlf.);

$\lambda_{max}^{Nujol}$ 2.75, 3.00, 5.85, 13.00, 14.24μ

Analysis.—Calc'd for $C_{29}H_{40}O_4$ (452.61): C, 76.77; H, 9.27. Found: C, 76.95; H, 8.91.

EXAMPLE 14

*5β-pregnane-16α,17α-diol-3,20-dione 16,17-acetophenonide*

To a stirred solution of 500 mg. of 5β-pregnane-3β,16α,17α-triol 16,17-acetophenonide in 7 ml. of acetone is added dropwise 0.4 ml. of an aqueous solution containing 80 mg. of chromic anhydride and 128 mg. sulfuric acid. After 10 minutes the excess oxidizing agent is decomposed by adding a few drops of methanol. On slow addition of 10 ml. of water, crystals separate which are filtered, washed well with water, and dried to give about 485 mg. of 5β-pregnane-16α,17α-diol-3,20-dione 16,17-acetophenonide having M.P. of about 126–128°, $[\alpha]_D^{23}$ +23.9°;

$\lambda_{max}^{Nujol}$ 5.86, 13.00, 14.25μ

Analysis.—Calc'd for $C_{29}H_{38}O_4$ (450.59): C, 77.30; H, 8.50. Found: C, 77.29; H, 9.18.

Similarly, by substituting other 16,17-cyclic acetals and ketals of 5β-pregnane-3β,16α,17α-triol-20-one 3-acetate for the steroid reactant in Example 13 and carrying out the procedures of Examples 13 and 14, the corresponding 16,17-cyclic acetals and ketals of 5β-pregnane-16α,17α-diol-3,20-dione are obtained.

EXAMPLE 15

*4β-bromo-5β-pregnane-16α,17α-diol-3,20-dione 16,17-acetophenonide*

To a solution of 537 mg. of 5β-pregnane-16α,17α-diol- 3,20-dione 16,17-acetophenonide in 10 ml. of glacial acetic acid, 1.98 ml. of an acetic acid solution containing 198 mg. of bromine and 70 mg. of sodium acetate is added dropwise after priming the reaction with a drop of 11% HBr in acetic acid. The reaction is then diluted with 40 ml. of water and extracted with 2 x 25 ml. portions of chloroform. The chloroform is washed with water, 5% NaHCO$_3$ and again with water and evaporated to dryness in vacuo. Crystallization of the residue from acetone-hexane gives about 470 mg. of 4β-bromo-5β-pregnane-16α,17α-diol-3,20-dione 16,17-acetophenonide having M.P. of about 174–178°, $[\alpha]_D^{23}$+30.6° (chlf.);

$\lambda_{max}^{Nujol}$ 5.88, 5.97, 12.99, 14.23μ

*Analysis.*—Calc'd. for C$_{29}$H$_{37}$O$_4$Br (529.51): C, 65.78; H, 7.04; Br, 15.09. Found: C, 65.98; H, 7.54; Br, 15.04.

Similarly, by substituting other 16,17-cyclic acetals and ketals of 5β-pregnane-16α,17α-diol-3,20-dione for the steroid reactant in Example 15, the corresponding 4β-bromo derivatives are formed.

EXAMPLE 16

*16α,17α-dihydroxyprogesterone 16,17-acetophenonide*

A solution containing 900 mg. of 4β-bromo-5β-pregnane-*16α,17α*-diol-3,20-dione 16,17-acetophenonide and 780 mg. anhydrous lithium chloride in 30 ml. of dimethylformamide (freshly distilled) is heated under nitrogen on a steam bath for three hours. After cooling the solution is diluted with 50 ml. of water and extracted with 2 x 50 ml. portions of chloroform. The combined chloroform extracts are washed with water and evaporated to dryness. Crystallization of the residue from 95% ethanol gives about 250 mg. of 16α,17α-dihydroxyprogesterone 16,17-acetophenonide having M.P. of about 146–150°, $[\alpha]_D$ +53.8° (chlf.);

$\lambda_{max}^{Nujol}$ 5.88, 6.00, 6.18, 12.95, 14.29μ

Similarly, by substituting other 16,17-cyclic acetals and ketals of 4β-bromo-5β-pregnane-16α,17α-diol-3,20-dione for the steroid reactant in Example 16, the corresponding progesterone derivatives are formed.

The invention may be variously otherwise embodied within the scope of the appended claims.

What is claimed is:

1. A steroid of the general formula

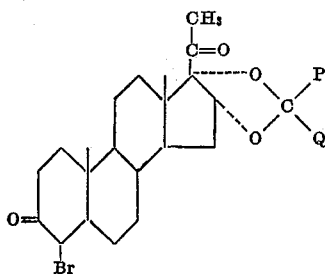

wherein P is selected from the group consisting of lower alkyl, halo (lower alkyl), monocyclic cycloalkyl, monocyclic aryl, monocyclic aryl-lower alkyl, monocyclic heterocyclic and monocyclic heterocyclic-lower alkyl; Q is selected from the group consisting of hydrogen, lower alkyl, halo(lower alkyl), monocyclic cycloalkyl, monocyclic aryl, monocylic aryl-lower alkyl, monocyclic heterocyclic and monocylic heterocyclic-lower alkyl; and together with the carbon to which they are joined P and Q are selected from the group consisting of cycloalkyl and monocyclic heterocyclic.

2. 4β-bromopregnane-16α,17α-diol-3,20-dione 16,17-acetophenonide.

3. A steroid of the general formula

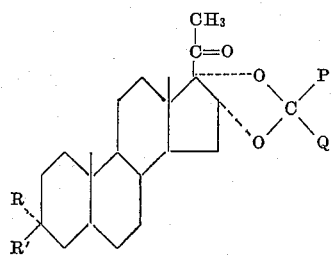

wherein P is selected from the group consisting of lower alkyl, halo (lower alkyl), monocyclic cycloalkyl, monocyclic aryl, monocyclic aryl-lower alkyl, monocylic heterocyclic and monocyclic heterocyclic-lower alkyl; Q is selected from the group consisting of hydrogen, lower alkyl, halo(lower alkyl), monocyclic cycloalkyl, monocyclic aryl, monocyclic aryl-lower alkyl, monocyclic heterocyclic and monocyclic heterocyclic-lower alkyl; together with the carbon to which they are joined P and Q are selected from the group consisting of cycloalkyl and monocyclic herterocyclic; R is hydrogen, R' is selected from the group consisting of hydroxy and the acyloxy radical of a hydrocarbon carboxylic acid of less than ten carbon atoms; and together R and R' is keto.

4. Pregnane-16α,17α-diol-3,20-dione 16,17-acetophenonide.

5. Pregnane-3β,16α,17α-triol-20-one 16,17-acetophenonide.

6. Pregnane-3β,16α,17α-triol-20-one 3-acetate 16,17-acetophenonide.

7. A process for preparing a steriod of the general formula

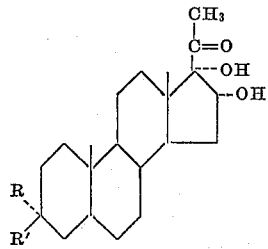

wherein R is hydrogen, R' is selected from the group consisting of hydroxy and the acyloxy radical of a hydrocarbon carboxylic acid of less than ten carbon atoms, and together R and R' is keto, which comprises interacting a corresponding steroid of the general formula

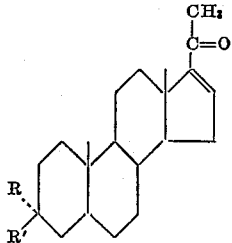

wherein R and R' are as above defined, with an alkali metal permanganate.

References Cited in the file of this patent

UNITED STATES PATENTS

| | | |
|---|---|---|
| 2,745,850 | Farrar | May 15, 1956 |
| 2,820,030 | Julian et al. | Jan. 14, 1958 |
| 2,901,492 | Herz et al. | Aug. 25, 1959 |
| 2,941,998 | Fried | June 21, 1960 |
| 2,959,586 | Kerwin et al. | Nov. 8, 1960 |

OTHER REFERENCES

Fieser et al.: Steroids (1959), page 621, Reinhold Publishing Co., New York.